United States Patent
Moran

(10) Patent No.: US 11,222,642 B2
(45) Date of Patent: Jan. 11, 2022

(54) AUDIO RECORDING OPTIMIZATION FOR CALLS SERVICED BY AN ARTIFICIAL INTELLIGENCE AGENT

(71) Applicant: Avaya Inc., Santa Clara, CA (US)

(72) Inventor: Thomas Moran, Galway (IE)

(73) Assignee: Avaya Inc., Santa Clara, CA (US)

( * ) Notice: Subject to any disclaimer, the term of this patent is extended or adjusted under 35 U.S.C. 154(b) by 250 days.

(21) Appl. No.: 16/257,681

(22) Filed: Jan. 25, 2019

(65) Prior Publication Data

US 2020/0243097 A1    Jul. 30, 2020

(51) Int. Cl.
| | | |
|---|---|---|
| *H04M 3/51* | (2006.01) | |
| *H04M 3/487* | (2006.01) | |
| *G10L 13/04* | (2013.01) | |
| *G10L 19/00* | (2013.01) | |
| *G06F 16/61* | (2019.01) | |
| *G06F 16/11* | (2019.01) | |
| *G06F 16/683* | (2019.01) | |

(52) U.S. Cl.
CPC ........ *G10L 19/0018* (2013.01); *G06F 16/113* (2019.01); *G06F 16/61* (2019.01); *G06F 16/685* (2019.01); *H04M 3/5175* (2013.01)

(58) Field of Classification Search
CPC ......... G10L 15/22; G10L 13/00; G10L 13/02; G10L 13/08; G10L 15/26; G10L 13/033; H04M 3/5183; H04M 2203/355; H04M 2250/74; H04M 3/42221; H04M 3/5166; H04M 3/5175
See application file for complete search history.

(56) References Cited

U.S. PATENT DOCUMENTS

| | | | | | |
|---|---|---|---|---|---|
| 5,949,854 | A | * | 9/1999 | Sato | H04M 1/651 379/88.06 |
| 6,526,395 | B1 | * | 2/2003 | Morris | G06N 3/004 706/15 |

(Continued)

OTHER PUBLICATIONS

Leviathan et al. "Google Duplex: An AI System for Accomplishing Real-World Tasks Over the Phone," Google, May 8, 2018, 6 pages [retrieved online from: ai.googleblog.com/2018/05/duplex-ai-system-for-natural-conversation.html].

(Continued)

*Primary Examiner* — Olujimi A Adesanya
(74) *Attorney, Agent, or Firm* — Sheridan Ross P.C.

(57) ABSTRACT

Artificial agents utilized for voice interactions continue to improve in their capacity to conduct more sophisticated interactions. Rather than just presenting a limited set of options, artificial agents are continuing to narrow the gap between generated speech and natural human speech. A requirement is often in place that spoken interactions be recorded, however, storing speech, even with data compression, is a resource-demanding task. Generated speech may be provided from content, such as text, and speech data. By recording an identifier of the content and associated speech data, storage processing and space requirements can be greatly reduced. Playback may be provided from a waveform of audio provided by the human participant and by selecting the content associated with the content identifier and generating speech of the content utilizing settings provided by the speech data.

20 Claims, 12 Drawing Sheets

(56) References Cited

U.S. PATENT DOCUMENTS

| | | | |
|---|---|---|---|
| 7,023,979 B1* | 4/2006 | Wu | H04M 3/5233 |
| | | | 379/265.11 |
| 7,739,115 B1* | 6/2010 | Pettay | G10L 15/26 |
| | | | 704/270 |
| 9,812,151 B1* | 11/2017 | Amini | G10L 15/26 |
| 9,992,336 B2* | 6/2018 | Scott | H04L 65/1006 |
| 2002/0072900 A1* | 6/2002 | Keough | G10L 13/033 |
| | | | 704/220 |
| 2004/0122668 A1* | 6/2004 | Marino | G10L 15/22 |
| | | | 704/249 |
| 2008/0254753 A1* | 10/2008 | Steenstra | H04R 5/04 |
| | | | 455/90.1 |
| 2009/0080640 A1* | 3/2009 | Waalkes | H04M 3/5166 |
| | | | 379/265.06 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2013/0300645 A1* | 11/2013 | Fedorov | G06F 3/01 |
| | | | 345/156 |
| 2014/0032471 A1* | 1/2014 | Reddy | G10L 15/22 |
| | | | 706/47 |
| 2015/0281445 A1* | 10/2015 | Kumar | H04M 3/5175 |
| | | | 379/88.01 |
| 2017/0206095 A1* | 7/2017 | Gibbs | G06T 13/40 |
| 2017/0278506 A1* | 9/2017 | Talwar | G10L 25/27 |
| 2019/0026936 A1* | 1/2019 | Gorur Sheshagiri | |
| | | | G06F 3/0304 |
| 2019/0279642 A1* | 9/2019 | Shukla | G10L 15/22 |
| 2019/0333504 A1* | 10/2019 | Chen | G10L 21/0364 |
| 2020/0137230 A1* | 4/2020 | Spohrer | H04M 3/5175 |

OTHER PUBLICATIONS

Shen et al. "Tacotron 2: Generating Human-like Speech from Text," Google, Dec. 19, 2017, 2 pages [retrieved online from: ai.googleblog.com/2017/12/tacotron-2-generating-human-like-speech.html].

* cited by examiner

| Content Identifier | Content | Content Description |
|---|---|---|
| 1.0 | Hello this is <Agent_Name> how can I help? | Generic greeting |
| 1.01 | Good afternoon, <Customer_formal_name>. My name is <Agent_Name>. How can I help you? | Formal greeting with day-portion |
| 1.02 | Good afternoon, <Customer_formal_name>. My name is <Agent_Name>. I understand you have a question about your bill. How can I help you? | Formal greeting with day-portion and subject matter |
| 3.14 | I found the problem. When you canceled your subscription the next month's bills were already processed. | Customer canceled after bills were ran |
| 7.35 | I've credited your account. | Courtesy credit |

| Portion 502 | Start 504 | Conent 506 | Content Setting 508 |
|---|---|---|---|
| AI Agent | 13:20:01.01 | 1.02 | • Speech pace 3<br>• Delay=0 — 510A |
| Customer | 13:20:04.20 | "Why did you charge my account again?" | • <Null> — 510B |
| AI Agent | 13:20:24.33 | 3.14 | • Speech pace 4<br>• Delay=1,2 — 510C |
| Customer | 13:20:58.00 | "I'm not paying again" | • <Null> — 510D |
| AI Agent | 13:21:10.43 | 7.35 | • Speech pace 4<br>• Delay=0.5 — 510E |

AUDIO RECORDING OPTIMIZATION FOR CALLS SERVICED BY AN ARTIFICIAL INTELLIGENCE AGENT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for data compression and particularly to compression voice data.

BACKGROUND

Many contact centers must, or choose to, record some or all audio calls, such as for legal or regulatory compliance. Additionally, recorded calls are useful for quality analysis, training, and coaching applications. Recording can require a significant storage space, especially when regulatory rules can demand that recordings be maintained for up to seven years. Additionally, significant CPU resources may be required to perform speech analysis and encryption of these audio recordings, if such functions are deployed.

SUMMARY

These and other needs are addressed by the various embodiments and configurations of the present invention. The present invention can provide a number of advantages depending on the particular configuration. These and other advantages will be apparent from the disclosure of the invention(s) contained herein.

Artificial agents are nodes on a communication network that provide computer generated audio content. While some artificial agents are limited to providing a user with a limited set of options and receiving the selected option, (e.g., "Did you say, 'Question about my bill?' If this is correct, say 'yes,' otherwise, say 'no.'"), improvements continue to be made. As improvements in artificial agents continues to be made, artificial agent will increase in their ability to engage in a human-like conversation with a customer and handle more complex interactions. Where recording is utilized, the storage space and processing demands will also continue to grow.

Prior art solutions may be utilized, such as data compression and silence deletion, however, such solutions may further benefit from the embodiments disclosed herein as an addition or alternative.

While not yet deployed, systems are under development that will enable a large number of customer voice calls to be serviced using artificial intelligence software that emulates a live human agent. Already, Google have demonstrated Google Duplex in number of customer/business interactions with positive results.

It will however still be necessary to provide a call recording solution in many artificial agent environments, such as due to legal requirements to maintain accurate and complete calls records in business areas such as financial, health, emergency, etc.

In one embodiment, calls that involve an artificial agent, the agent portion of the audio is not stored but instead substituted with a set of data comprising parameters and text that were used to generate the original audio. The customer leg may be recorded, such as by using G711, G729, or similar codecs, which may then be combined with agent data to constitute a full recording of the conversation. When a call is replayed, the customer audio leg is combined with the agent stream which is re-synthesized on demand and synchronized with the customer audio stream. Thus, the playback of the recording sounds exactly the same as the original recording. Only the synthesis parameters/timing alignment and text associated with the agent conversation are stored. Hence the storage requirements are significantly reduced.

Both audio streams (customer and agent) may be temporarily stored in memory when the call is in progress, and the re-synthesized agent audio may then be compared with the actual recording as a validation check. This ensures that the recording is a truly accurate reflection of the original call, including the relative timing with the customer audio leg—before the final recording/automated agent data is committed to long-term storage. This implementation provides an extra check to ensure accuracy, as may be required to satisfy regulatory compliance requirements.

In another embodiment, Speech Analytics (SA) may be omitted for the agent portion, whereby the agent audio transcription is already known by the system, so less processing is required by the SA application to present the usual transcriptions. This applies to both historical and real time speech analytics. Also "live monitoring" is a capability used by supervisors to routinely inspect audio calls as they are in progress, the real-time transcription—comprising the known agent portion—may be provided as an extra aid to the supervisor.

In another embodiment, encrypting the recording requires less CPU and other computation and storage resources as only the agent text and synthesis parameters require encryption and, once decrypted, provide an accurate playback of the call.

In one embodiment, a server is disclosed, comprising: a microprocessor; a data storage; and network interface; and wherein the microprocessor: preforms a two-way interactive voice communication with a user device connected, via the network interface to a network, wherein the microprocessor provides a first portion of the two-way voice communication and receives a second portion of the two-way communication and wherein the first portion comprises speech generated by the microprocessor and the second portion comprise speech received by the microprocessor; and store, in the data storage, a recorded two-way voice communication in the data storage, comprising speech data utilized by the microprocessor to generate the speech of the first portion and an audio waveform recording of the second portion.

In another embodiment, a method is disclosed, comprising: engaging in an interactive two-way voice communication between a microprocessor and a user device over a network; generating, by the microprocessor, a first portion of the interactive two-way voice communication comprising speech generated by the microprocessor and provided to the user device via the network; and receiving, by the microprocessor, a second portion of the interactive two-way voice communication comprising speech received from the user device via the network; recording the two-way voice communication, the recorded two-way voice comprising speech data utilized by the microprocessor to generate the speech of the first portion and an audio recording of the second portion.

In another embodiment, a system, comprising: means to engage in an interactive two-way voice communication between a microprocessor and a user device over a network; means to generate a first portion of the interactive two-way voice communication comprising speech generated by the microprocessor and provided to the user device via the network; and means to receive a second portion of the interactive two-way voice communication comprising speech received from the user device via the network; means to record the two-way voice communication, the recorded two-way voice comprising speech data utilized by the microprocessor to generate the speech of the first portion and an audio recording of the second portion and wherein the speech data is absent sound waveform data.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shalt be given its broadest possible interpretation in accordance with 35 U.S.C., Section 112(f) and/or Section 112, Paragraph 6. Accordingly, a claim incorporating, the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 4 depicts a speech content record in accordance with embodiments of the present disclosure;

FIG. 5 depicts an interaction recording in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
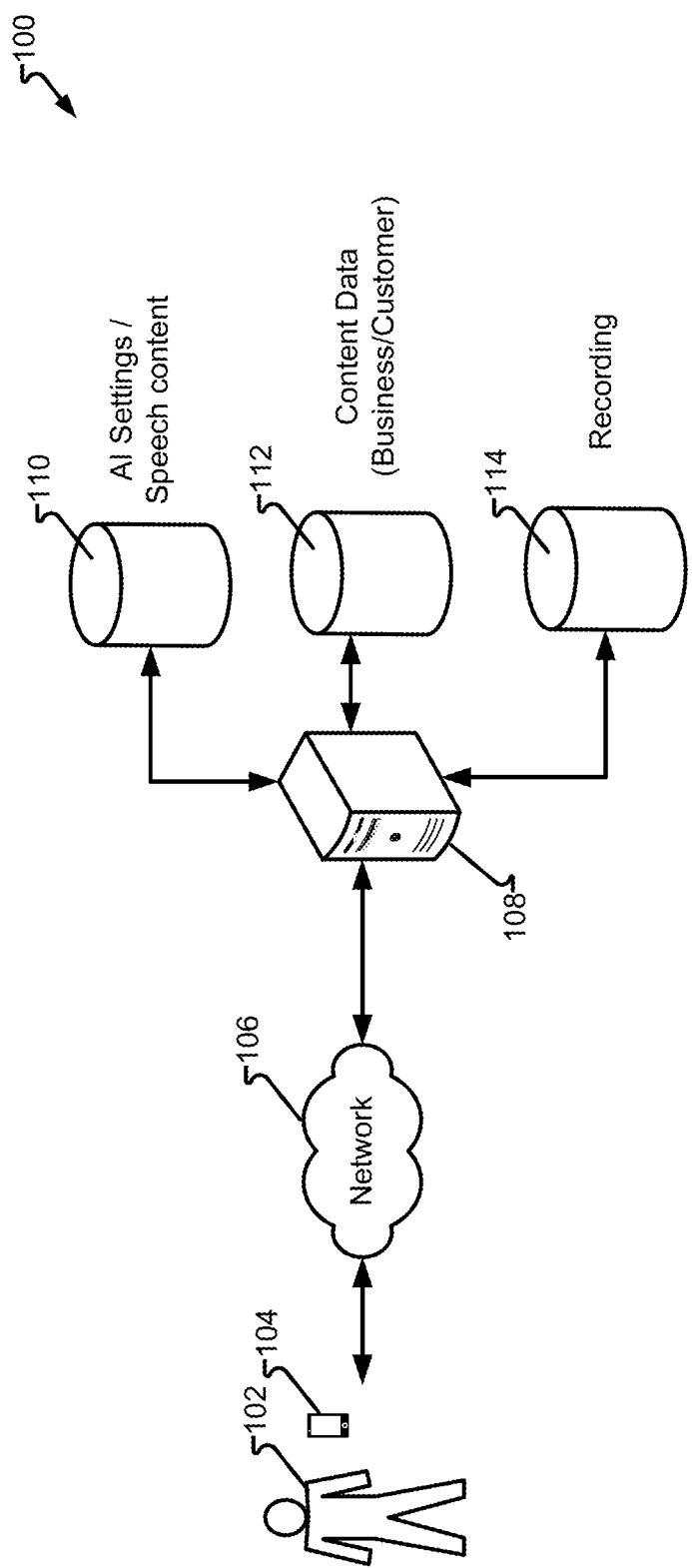
FIG. 1 depicts a system in accordance with embodiments of the present disclosure.

FIG. 1 depicts system 100 in accordance with embodiments of the present disclosure. In one embodiment, user 102 utilizes user device 104 to communicate over network 106 and thereby forming one half of a voice interaction. Server 108, via at least one microprocessor configured with instructions (discussed more completely below) executed by the at least one microprocessor to cause server 108 to operate as an artificial intelligent (AI) agent to also communicate over network 106 by receiving voice (spoken) communications and providing generated speech and thereby forming the second half of the voice interaction.

Server 108 may be one or more computing devices comprising one or more microprocessors, memory, and data storage. Data storage may be combined with memory or separate, such as an internal and/or external storage device. Data storage may comprise one more databases, such as settings and speech content database 110, content database 112, and recorded interaction database 114. It should be appreciated that settings and speech content database 110, content database 112, and recorded interaction database 114 may be embodied as more or few databases as a matter of design choice. In one embodiment, settings and speech content database 110 comprises speech settings and/or speech content for server 108. In another embodiment, content database 112 comprises business information and/or logic. For example, customer records, product offerings, account records, etc. In another embodiment, recorded interaction database 114 maintains a recording of the interaction, as will be described more completely with respect to the embodiments that follow. Server 108, may also execute a playback application to cause contents of recorded interaction database 114 to be reproduced.

Figure 2:
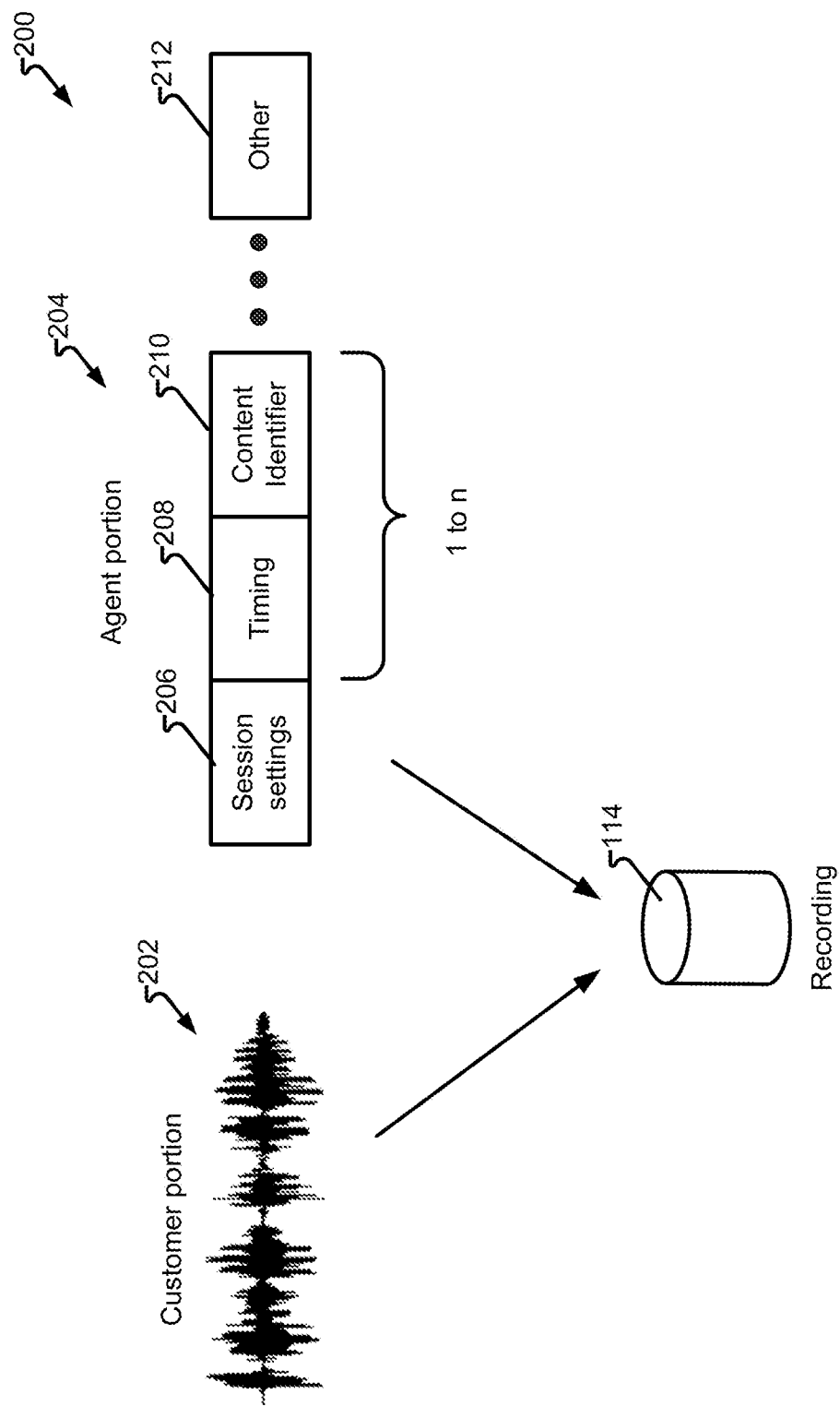
FIG. 2 depicts an interaction in accordance with embodiments of the present disclosure.

FIG. 2 depicts interaction 200 in accordance with embodiments of the present disclosure. In one embodiment, customer speech waveform 202 is produced by user device 104 receiving speech from user 102. In another embodiment, user device 104 executes an application to generate customer speech waveform 202 without the need for human input. Customer speech waveform 202 is received by server 108 as speech, which may be analog electrical signals (e.g., "copper wire") or encoded sound as data packets (e.g., Session-Initial Protocol (SIP), Voice Over Internet Protocol (VoIP) to convey the speech originating form user device 104 to server 108. Customer speech waveform 202 may then be recorded in recorded interaction database 114, which may be stored as a sound file (e.g., AAC, MP3, etc.) or portion thereof.

While the audio (speech) output of server 108 may be saved in recorded interaction database 114 as a sound file, by recording indicia of the content and settings utilized to generate the speech, the processing demands on server 108 and/or storage demands on recorded interaction database 114 can be reduced. In another embodiment, recorded interaction database 114 stores agent portion 204 as a data structure which is sound-describing and absent waveforms or other sound-containing data structure. As used herein, "sound-describing" comprises settings and in some embodiments, textual content, that is (or was) utilized by a speech generating device or process to output generated speech from text (which may be maintained in a machine-readable form). In contrast, "sound-comprising" includes analog waveforms and the output of codecs that may comprise data indicating a frequency of sound received as an input to the codec and is operable to record voice and other sounds with the same functionality.

AI agent speech record 204 may comprise a number of data records, such as session settings 206, timing settings 208, content identifier 210, and optionally other information 212. In one embodiment, a particular voice interaction may have one session setting 206 associated with a single agent. In another embodiment, a subsequent session setting 206 may be applied, such as to provide the appearance of a different agent engaging in the interaction or to change a session characteristic. For example, user 102 may initially be friendly causing server 108 to utilize one set of session settings 206 (e.g., perky, friendly, quirky, etc.), but later in the interaction user 102 became hostile or angry causing server 108 to utilize a different set of sessions settings 206 (e.g., professional, strict, stoic, etc.).

Content identifier 210, which may be utilized with timing record 208, maintains indicia of the content spoken. For example, settings and speech content database 110 may maintain a record of content identifiers and their associated content. As a result, server 108 may select and generate speech (e.g., "Is there anything else I can help you with?") that is associated with a content identifier value (e.g., "End_01," "Closing3.1", "7.3", etc.) of content identifier 210. Optionally, timing record 208 may comprise data associated with pace, pauses, and/or an initial delay. Timing record 208 may have a default value, such as may be maintained with content identifier 210 and/or a customized value. For example, content identifier 210 may have a value associated with the text, "Wait, before you do that," a phrase that may have a greater degree of urgency and, therefore, timing record 208 may have a value indicating little or no delay is to occur before generating, and thereby presenting the speech to user 102. In contrast, content identifier 210 may have a value associated with the text, "I may have found the problem," a phrase that may have a low degree of urgency and a pause before speaking may give user 102 the impression of thoughtful contemplation. Therefore, timing record 208 may have a value indicating a delay should occur before presenting the speech to user device 104. In another embodiment, timing record 208 may be a data structure defining a plurality of pauses and their location. Optional other record 212 may be utilized for other purposes, such as a description of the content associated with content identifier 210 (e.g., "implemented on . . . ", "version number", etc.) and/or session settings 206 (e.g., "Male agent #13," "Female agent with Spanish accent," etc.).

Figure 3:
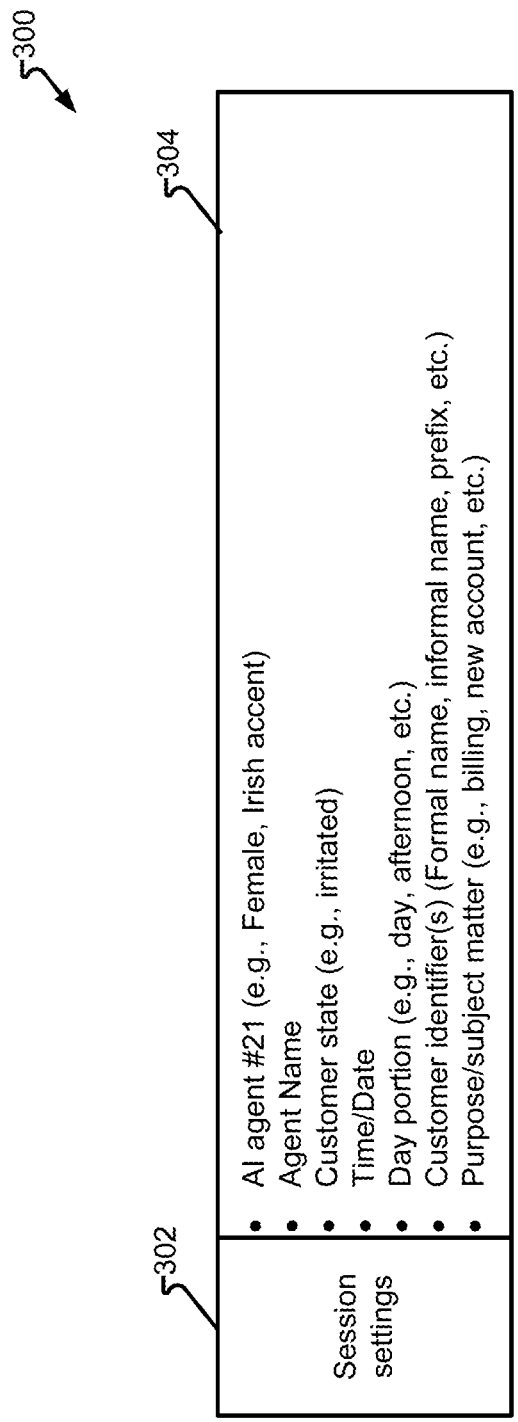
FIG. 3 depicts a settings data structure in accordance with embodiments of the present disclosure.

FIG. 3 depicts settings data structure 300 in accordance with embodiments of the present disclosure. In one embodiment, settings data structure comprises a value for session settings 206 (see FIG. 2). Session settings data structure 300 may be one or more records of a larger data structure and comprise record identifier 302. Values 304 of settings data structure 300 are then read and utilized to configure server 108 to provide particular human-like vocal appearances with respect to speech generated by server 108. For example, values 304 may comprise one or more of gender, age, nationality, accent, location, dialect, formality, education, confidence, patience, pace, or mood. While certain values (e.g., gender age, nationality, accent, etc.) may modify the waveform generated by server 108, other values (e.g., location, formality, education, etc.) may affect the content selected for generation, especially non-content related speech. For example, if the agent is to have the appearance of being in one location the content generated may include, " . . . it's early here . . . " or some other indication of local time, weather, or events for the apparent location. A combination of content and waveform may be determined by the certain values. For example, if the agent is to give the impression of youth, the pitch may be higher and the meter faster, as well as, words like "yes" generated as the waveform, "yeah" and/or the insertion of certain non-content related speech. For example, a speech that includes, " . . . you can always buy a new one, jk" would have a different vocal appearance that if "jk" was fully spoken out as, "just kidding," and different still from the vocal appearance conveyed by other speech, such as, "I'm sure we can get it working so you don't have to buy a new one."

FIG. 4 depicts speech content records 400 in accordance with embodiments of the present disclosure. In one embodiment, speech content records 400 may be maintained in settings and speech content database 110. Speech content record 400 may comprise a plurality of records 408. Ones of records 408 may have data fields, such as content identifier 402, content 404, and optionally content description 406. The value of content identifier 402 may then be utilized by server 108 to store AI agent speech record 204 comprising content identifier 210 having the same value as content identifier 402, for a particular content 404 utilized to generate speech.

Content 404, in one embodiment, is text (e.g., ASCII, EBCDIC, etc.). In another embodiment, content 404 is a waveform, whereby server 108 omits speech generation and presents the waveform. Examples of waveforms may include, voicemail greetings and music-on-hold. Optionally, content description 406 may be utilized to provide other information regarding a particular one of records 408.

Content 404 may include links or references to other data values. For example, record 408A has a value for content 404 of "Hello this is <Agent_Name> how can I help?" the "<Agent_Name>" may be a link or other reference to a data value maintained elsewhere, such as a session setting (e.g., "set Agent_Name='Alice'"). The resulting speech generated then incorporating the value accessed by the link or other reference: "Hello this is Alice how can I help?" Punctuations or other speech-modification symbols may be utilized or omitted as necessary, such as to cause server 108 to present speech with a rising tone associated with asking a question or commas or other punctuations to instill pauses as an addition or alternative to timing record 208. When stored in recorded interaction database 114, dynamic values may be incorporated by reference or value. For example, recording record 408B in recorded interaction database 114 may have content identifier 210 by itself, with values for the customer's formal name and agent's name maintained elsewhere (e.g., "1.01") or with the variable utilized (e.g., "1.01; Customer_formal_name; Agent_Name"). In another example, recording record 408B in recorded interaction database 114 may have content identifier 210 and text (e.g., "1.01; 'Mr. Smith'; 'Alice'). Punctuations or other speech-modification symbols may be utilized or omitted as necessary, such as to cause server 108 to present speech with a rising tone associated with asking a question or commas or other punctuations to instill pauses as an addition or alternative to timing record 208. As can be appreciated, other methodologies may be utilized to store content 404 as value of content identifier 402 and incorporate the value or reference to runtime or other dynamic variables, without departing from the scope of the embodiments herein.

FIG. 5 depicts interaction recording 500 in accordance with embodiments of the present disclosure. In one embodiment, interaction recording 500 may be maintained in recorded interaction database 114 during or following an interaction between server 108 and user device 104 that comprises a first portion, speech provided by server 108 to user device 104, and a second portion, speech provided by user device 104 to server 108, such as may be captured by user 102 speaking. Interaction recording 500 may comprise one or more records 510.

In one embodiment, at least one record 510 comprises a number of fields, such as portion identifier 502, start time identifier 504, content 506, and content settings 508. Portion identifier 502 comprises a value associated with the speaking party, for example, customer or AI agent. In another embodiment, portion identifier 502 may be more detailed, such as more identification of a category of AI agent or customer or a specific AI agent and/or a specific customer. Time identifier 504 comprises a particular time that the associated content 506 begins. Optionally, time identifier 504 may comprise an ending time and/or duration. Time identifier 502 may be an absolute time, local time, or reference time (e.g., number of seconds past midnight, number of seconds into the interaction, etc.). In a further embodiment, time identifier 502 may comprise day and/or date information.

In another embodiment, content 506 stores waveforms provided by user device 104, such as content 506 associated with record 510B and 510D. In another embodiment, content 506 stores indicia, such as content identifier value 210 of agent portion 204 (see FIG. 2) selected from speech content records 400. Optionally, content settings 508 are utilized, such as to indicate content delivery of the resulting waveform comprising settings utilized to generate the speech identified in content 506. For example, if a particular phrase identified in content 506 (e.g., content 506 associated with record 510A, 510C, or 510E had a setting different from the session setting, such as provided by session settings 206). Content settings 508 may provide for initial silence, speed, urgency, tone, insertion of non-verbalized content (e.g., "uhm," "yeah," "hmm," etc.), or an amount of change to any one or more of the delivery settings, such as a deviation from a default or session settings 206.

As a benefit, server 108, when provided with content 506, which comprises indicia of speech generated by server 108 and not the speech itself, requires less storage space in recorded interaction database 114, but may be reproduced accurately by accessing the content identified and incorporating content delivery settings provided by session settings 206 and/or content settings 508. It should also be appreciated that, although interactions recording 500 is depicted as a single data structure, that multiple data structures may be utilized, such as one for generated speech and one for speech provided by user device 104. A session identifier may also be provided to associate each record 510 with a particular interaction between user device 104 and server 108.

Figure 6:
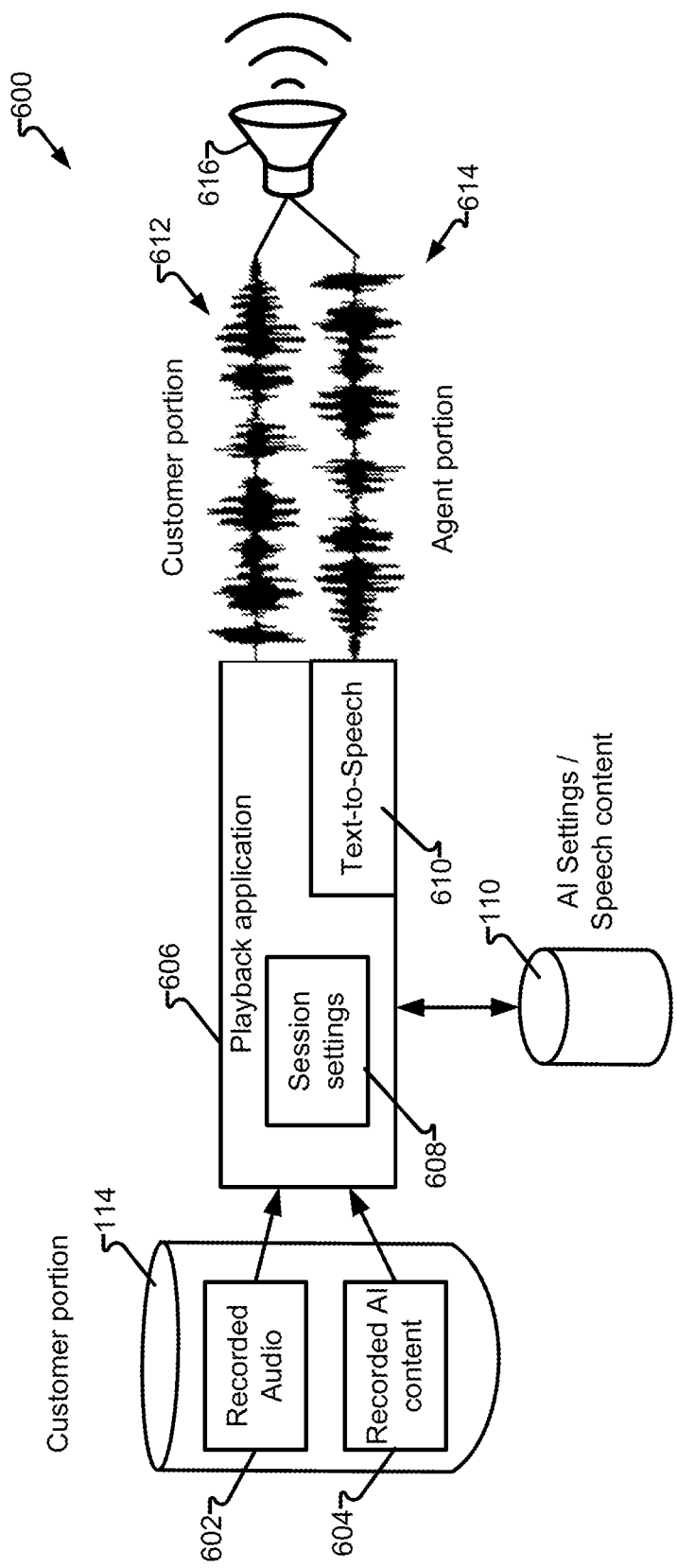
FIG. 6 depicts playback system in accordance with embodiments of the present disclosure.

FIG. 6 depicts playback system 600 in accordance with embodiments of the present disclosure. In one embodiment, recorded interaction database 114 comprises recorded audio 602, such as content 506 comprising waveforms provided by user device 104 (e.g., records 510B and 510D) and content 506 comprising indicia of content utilized by server 108 to generate speech (e.g., records 510A, 510C, and 510E). Application 606 is executed by server 108 and/or other specifically configured microprocessor executing playback instructions to read selected content of recorded interaction database 114 and create an audio output therefrom. The audio output may be to speaker 616 and/or other device, such as a waveform recording device.

In one embodiment, playback application 606 retrieves and loads a copy of session settings 206 into sessions settings 608, such as from settings and speech content database 110. Playback application 505 may obtain speech content (e.g., speech content records 400) from settings and speech content database 110 or other repository. Playback application 606 may play waveform content from recorded audio 602, such as by executing a codec associated with the particular content therein. Playback application 606 may also reconstruct the previously generated speech by accessing content (e.g., content 404) identified with a particular interaction in interaction records 500. Playback applications 606, as a precursor to reconstructing the speech, causes text-to-speech generator 610 to generate speech (waveform). Text-to-speech generator 610 may be configured with session settings 608 and/or content settings 508 to recreate the speech as it was delivered to user device 104 as first portion 614 comprising generated speech and second portion 612 comprising playback of waveforms received from user device 104.

Figure 7:
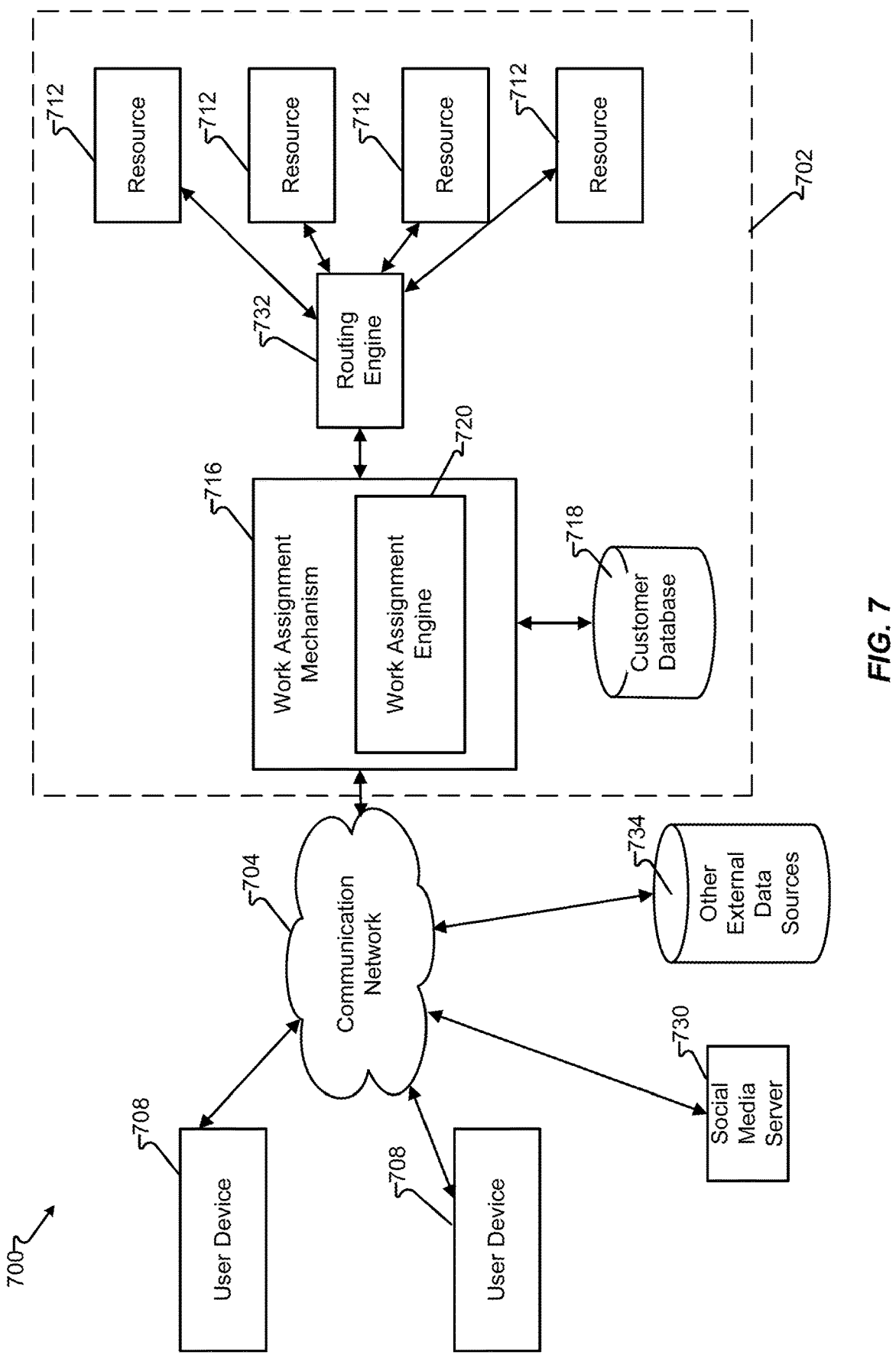
FIG. 7 depicts a communication system in accordance with embodiments of the present disclosure.

FIG. 7 depicts communication system 700 is discussed in accordance with at least some embodiments of the present disclosure. The communication system 700 may be a distributed system and, in some embodiments, comprises a communication network 704 connecting one or more communication devices 708 to a work assignment mechanism 716, which may be owned and operated by an enterprise administering contact center 702 in which a plurality of resources 712 is distributed to handle incoming work items (in the form of contacts) from customer communication devices 708.

Contact center 702 is variously embodied to receive and/or send messages that are or are associated with work items and the processing and management (e.g., scheduling, assigning, routing, generating, accounting, receiving, monitoring, reviewing, etc.) of the work items by one or more resources 712. The work items are generally generated and/or received requests for a processing resource 712 embodied as, or a component of, an electronic and/or electromagnetically conveyed message. Contact center 702 may include more or fewer components than illustrated and/or provide more or fewer services than illustrated. The border indicating contact center 702 may be a physical boundary (e.g., a building, campus, etc.), legal boundary (e.g., company, enterprise, etc.), and/or logical boundary (e.g., resources 712 utilized to provide services to customers for a customer of contact center 702).

Furthermore, the border illustrating contact center 702 may be as-illustrated or, in other embodiments, include alterations and/or more and/or fewer components than illustrated. For example, in other embodiments, one or more of resources 712, customer database 718, and/or other component may connect to routing engine 732 via communication network 704, such as when such components connect via a public network (e.g., Internet). In another embodiment, communication network 704 may be a private utilization of, at least in part, a public network (e.g., VPN); a private network located, at least partially, within contact center 702; or a mixture of private and public networks that may be utilized to provide electronic communication of components described herein. Additionally, it should be appreciated that components illustrated as external, such as social media server 730 and/or other external data sources 734 may be within contact center 702 physically and/or logically, but still be considered external for other purposes. For example, contact center 702 may operate social media server 730 (e.g., a website operable to receive user messages from customers and/or resources 712) as one means to interact with customers via their customer communication device 708.

Customer communication devices 708 are embodied as external to contact center 702 as they are under the more direct control of their respective user or customer. However, embodiments may be provided whereby one or more customer communication devices 708 are physically and/or logically located within contact center 702 and are still considered external to contact center 702, such as when a customer utilizes customer communication device 708 at a kiosk and attaches to a private network of contact center 702 (e.g., WiFi connection to a kiosk, etc.), within or controlled by contact center 702.

It should be appreciated that the description of contact center 702 provides at least one embodiment whereby the following embodiments may be more readily understood without limiting such embodiments. Contact center 702 may be further altered, added to, and/or subtracted from without departing from the scope of any embodiment described herein and without limiting the scope of the embodiments or claims, except as expressly provided.

Additionally, contact center 702 may incorporate and/or utilize social media web site 730 and/or other external data sources 734 may be utilized to provide one means for a resource 712 to receive and/or retrieve contacts and connect to a customer of a contact center 702. Other external data sources 734 may include data sources, such as service bureaus, third-party data providers (e.g., credit agencies, public and/or private records, etc.). Customers may utilize their respective customer communication device 708 to send/receive communications utilizing social media server 730.

In accordance with at least some embodiments of the present disclosure, the communication network 704 may comprise any type of known communication medium or collection of communication media and may use any type of protocols to transport electronic messages between endpoints. The communication network 704 may include wired and/or wireless communication technologies. The Internet is an example of the communication network 704 that constitutes an Internet Protocol (IP) network consisting of many computers, computing networks, and other communication devices located all over the world, which are connected through many telephone systems and other means. Other examples of the communication network 704 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 704 need not be limited to any one network type and instead may be comprised of a number of different networks and/or network types. As one example, embodiments of the present disclosure may be utilized to increase the efficiency of a grid-based contact center 702. Examples of a grid-based contact center 702 are more fully described in U.S. Patent Publication No. 2010/0296417 to Steiner, the entire contents of which are hereby incorporated herein by reference. Moreover, the communication network 704 may comprise a number of different communication media, such as coaxial cable, copper cable/wire, fiber-optic cable, antennas for transmitting/receiving wireless messages, and combinations thereof.

The communication devices 708 may correspond to customer communication devices. In accordance with at least some embodiments of the present disclosure, a customer may utilize their communication device 708 to initiate a work item. Illustrative work items include, but are not limited to, a contact directed toward and received at a contact center 702, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 704. For example, the work item may be transmitted as a telephone call, a packet or collection of packets (e.g., IP packets transmitted over an IP network), an email message, an Instant Message, an SMS message, a fax, and combinations thereof In some embodiments, the communication may not necessarily be directed at the work assignment mechanism 716, but rather may be on some other server in the communication network 704 where it is harvested by the work assignment mechanism 716, which generates a work item for the harvested communication, such as social media server 730. An example of such a harvested communication includes a social media communication that is harvested by the work assignment mechanism 716 from a social media network or server 730. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 708 and the format of the communication. In particular, work items are logical representations within a contact center 702 of work to be performed in connection with servicing a communication received at contact center 702 (and, more specifically, the work assignment mechanism 716). The communication may be received and maintained at the work assignment mechanism 716, a switch or server connected to the work assignment mechanism 716, or the like, until a resource 712 is assigned to the work item representing that communication. At which point, the work assignment mechanism 716 passes the work item to a routing engine 732 to connect the communication device 708, which initiated the communication, with the assigned resource 712.

Although the routing engine 732 is depicted as being separate from the work assignment mechanism 716, the routing engine 732 may be incorporated into the work assignment mechanism 716 or its functionality may be executed by the work assignment engine 720.

In accordance with at least some embodiments of the present disclosure, the communication devices 708 may comprise any type of known communication equipment or collection of communication equipment. Examples of a suitable communication device 708 include, but are not limited to, a personal computer, laptop, Personal Digital Assistant (PDA), cellular phone, smart phone, telephone, or combinations thereof In general, each communication device 708 may be adapted to support video, audio, text, and/or data communications with other communication devices 708 as well as the processing resources 712. The type of medium used by the communication device 708 to communicate with other communication devices 708 or processing resources 712 may depend upon the communication applications available on the communication device 708. Although the embodiments herein are generally directed to voice-only communications, it should be appreciated that voice, as a component of an audio-video communication, may also be utilized. For example, the agent (as provided by server 108) may omit video, utilize a static image, or utilize an avatar for video.

In one embodiment, server 108 comprises one embodiment of resource 712 when embodied as a server or other electronic computing device. Server 108 may optionally incorporate or be incorporated in any one or more computing, storage, or communication components of content center 702.

In accordance with at least some embodiments of the present disclosure, the work item is sent toward a collection of processing resources 712 via the combined efforts of the work assignment mechanism 716 and routing engine 732. The resources 712 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 702.

As discussed above, the work assignment mechanism 716 and resources 712 may be owned and operated by a common entity in a contact center 702 format. In some embodiments, the work assignment mechanism 716 may be administered by multiple enterprises, each of which has its own dedicated resources 712 connected to the work assignment mechanism 716.

In some embodiments, the work assignment mechanism 716 comprises a work assignment engine 720, which enables the work assignment mechanism 716 to make intelligent routing decisions for work items. In some embodiments, the work assignment engine 720 is configured to administer and make work assignment decisions in a queueless contact center 702, as is described in U.S. patent application Ser. No. 12/882,950, the entire contents of which are hereby incorporated herein by reference. In other embodiments, the work assignment engine 720 may be configured to execute work assignment decisions in a traditional queue-based (or skill-based) contact center 102.

The work assignment engine 720 and its various components may reside in the work assignment mechanism 716 or in a number of different servers or processing devices. In some embodiments, cloud-based computing architectures can be employed whereby one or more components of the work assignment mechanism 716 are made available in a cloud or network such that they can be shared resources among a plurality of different users. Work assignment mechanism 716 may access customer database 718, such as to retrieve records, profiles, purchase history, previous work items, and/or other aspects of a customer known to contact center 702. Customer database 718 may be updated in response to a work item and/or input from resource 712 processing the work item.

It should be appreciated that one or more components of contact center 702 may be implemented in a cloud-based architecture in their entirety, or components thereof (e.g., hybrid), in addition to embodiments being entirely on-premises. In one embodiment, customer communication device 708 is connected to one of resources 712 via components entirely hosted by a cloud-based service provider, wherein processing and data storage elements may be dedicated to the operator of contact center 702 or shared or distributed amongst a plurality of service provider customers, one being contact center 702.

In one embodiment, a message is generated by customer communication device 708 and received, via communication network 704, at work assignment mechanism 716. The message received by a contact center 702, such as at the work assignment mechanism 716, is generally, and herein, referred to as a "contact." Routing engine 732 routes the contact to at least one of resources 712 for processing.

Figure 8:
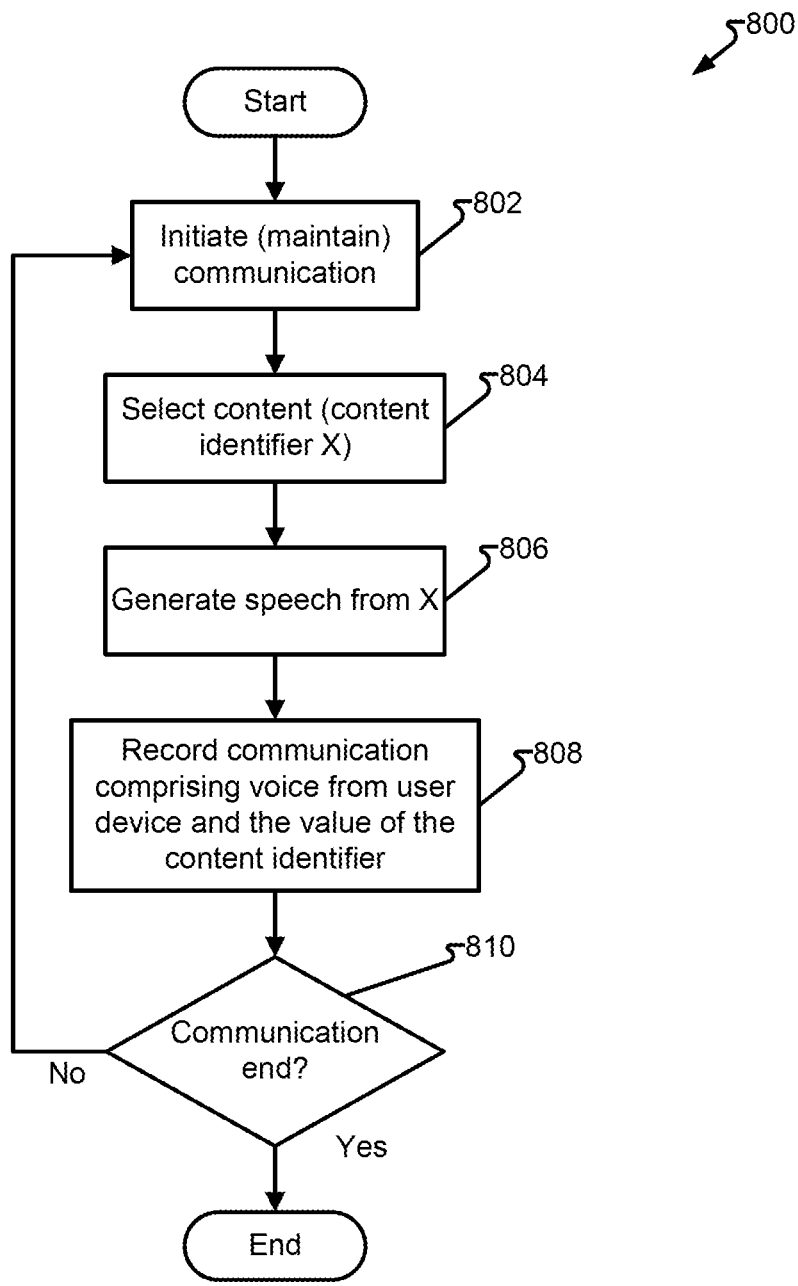
FIG. 8 depicts a first recording process in accordance with embodiments of the present disclosure.

FIG. 8 depicts recording process 800 in accordance with embodiments of the present disclosure. In one embodiment, process 800 is an algorithm or a portion of an algorithm executed by a microprocessor configured with machine instructions to carry out the algorithm, such as a microprocessor of server 108. Process 800 starts and a voice communication is initiated, or if already initiated, maintained, in step 802, such as with user device 104. Step 804 selects a particular content to deliver, as speech, to user device 104. The speech may be generated with dynamic or variable information (see, record 408A and 408B) or static text (see record 408A, 408B, and 408C) and identified by content identifier "X" (e.g., a value of content identifier 402). Speech is generated therefrom in step 806, such as for delivery to user device 104. The speech is record as the content identifier "X". Text 810 determines if the communication has ended and, if yes, process 800 ends. Otherwise, process 800 continues back to step 802.

Figure 9:
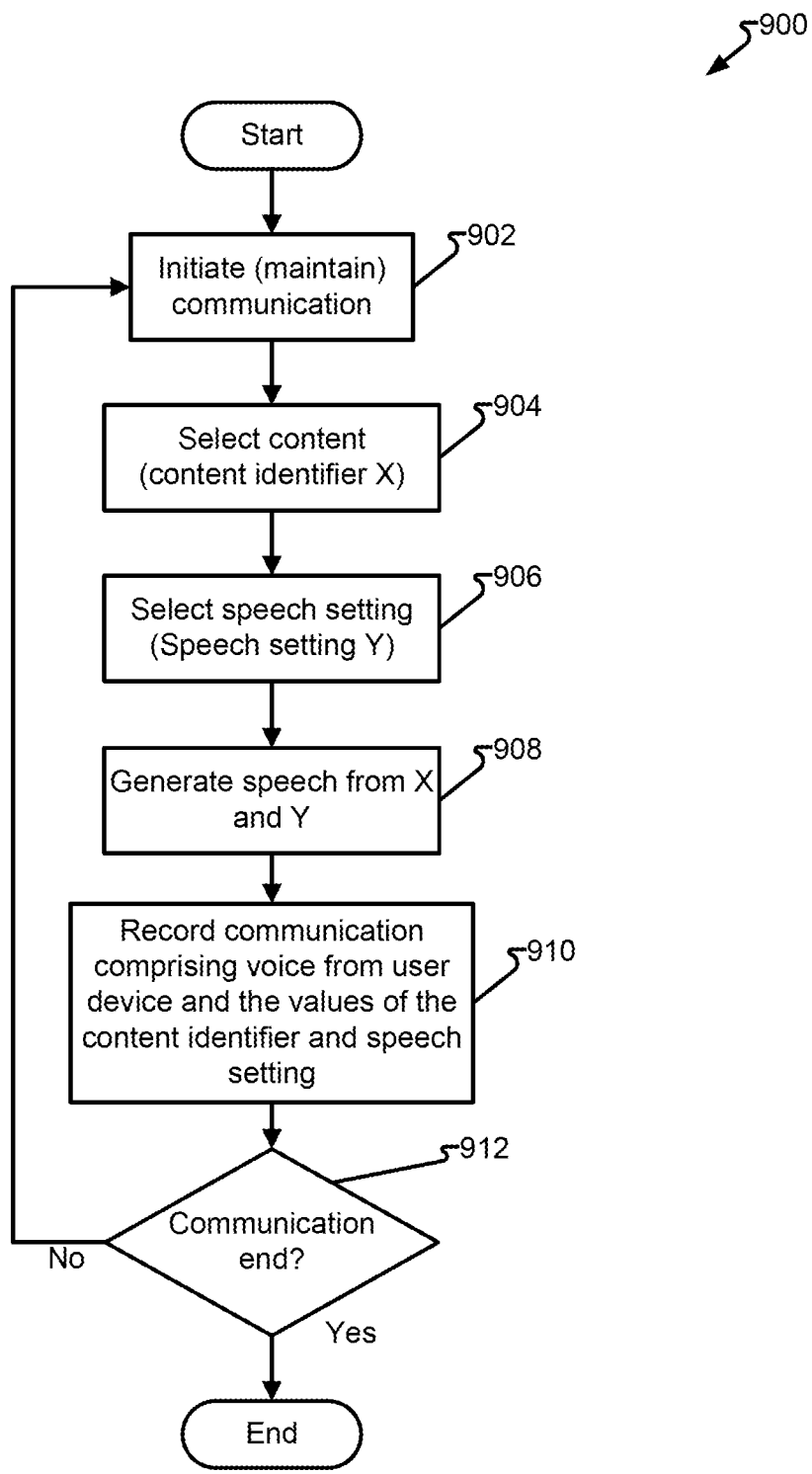
FIG. 9 depicts a second recording process in accordance with embodiments of the present disclosure.

FIG. 9 depicts a second recording process 900 in accordance with embodiments of the present disclosure. In one embodiment, process 900 is an algorithm or a portion of an algorithm executed by a microprocessor configured with machine instructions to carry out the algorithm, such as a microprocessor of server 108. Process 900 starts and a voice communication is initiated, or if already initiated, maintained, in step 902, such as with user device 104. Step 904 selects a particular content to deliver, as speech, to user device 104. The speech may be generated with dynamic or variable information (see, record 408A and 408B) or static text (see record 408A, 408B, and 408C) and identified by content identifier "X" (e.g., a value of content identifier 402).

In step 906, speech settings "Y" are selected to further configure the speech generation of the content (e.g., a value of speech settings 304). In step 908, speech is generated from the content and utilizing the speech settings for delivery, such as to user device 104. The speech is record as the content identifier "X" and settings "Y". Text 912 determines if the communication has ended and, if yes, process 900 ends. Otherwise, process 900 continues back to step 902.

Figure 10:
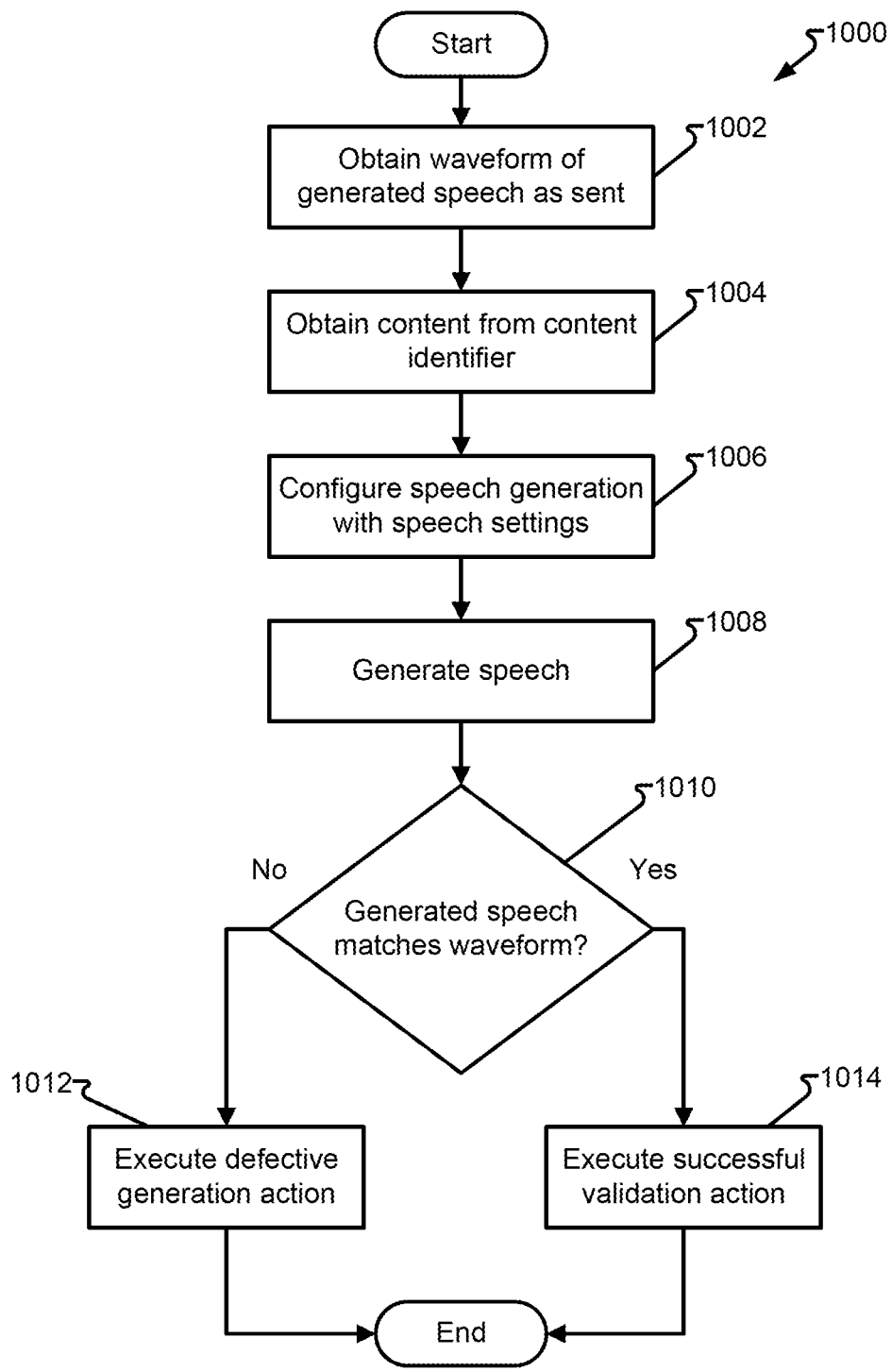
FIG. 10 depicts a verification process in accordance with embodiments of the present disclosure.

FIG. 10 depicts a verification process 1000 in accordance with embodiments of the present disclosure. In one embodiment, process 1000 is an algorithm or a portion of an algorithm executed by a microprocessor configured with machine instructions to carry out the algorithm, such as a microprocessor of server 108. In one embodiment, step 1002 obtains a waveform generated by speech sent, such as the output of steps 806 or 908 of process 800 and 900. Content (e.g., content 404) from a content identifier (e.g., content identifier 402) utilized in a communication is obtained in step 1004. Step 1006 configures a speech generator to generate the speech and, in step 1008, generates the speech.

Next, in test 1010, the waveform of step 1002 is compared to the speech generated in step 1008 and, if identical or identical within a previously determined margin of error, the generation is identified as valid in step 1014. Otherwise the generation is identified as invalid in step 1012.

Additionally or alternatively, step 1012 may cause the communication with server 108 to be routed to a terminal operated by a human agent (e.g., a human operating a terminal comprising resource 112) to monitor and/or take over the communication. As a further embodiment, step 1002 may occur "downstream" in the communication process and, ideally, at the last component prior to network 106, such as an edge device. However, other "downstream" components, such as a telephony switch may monitor the call as it would appear to a human utilizing a telephone as the source of the generated speech in step 1002. While line noise, issues with user device 104, or environmental factors may cause the generated speech to differ between the as-transmitted to network 106 and the as-received at user device 104, by monitoring the telephony line, the generated speech can be determined to likely be received in a valid form. In another embodiment, user device 104 may capture the waveform data for transmission back to server 108 and utilized, in whole or in part, as the waveform in step 1002.

Figure 11:
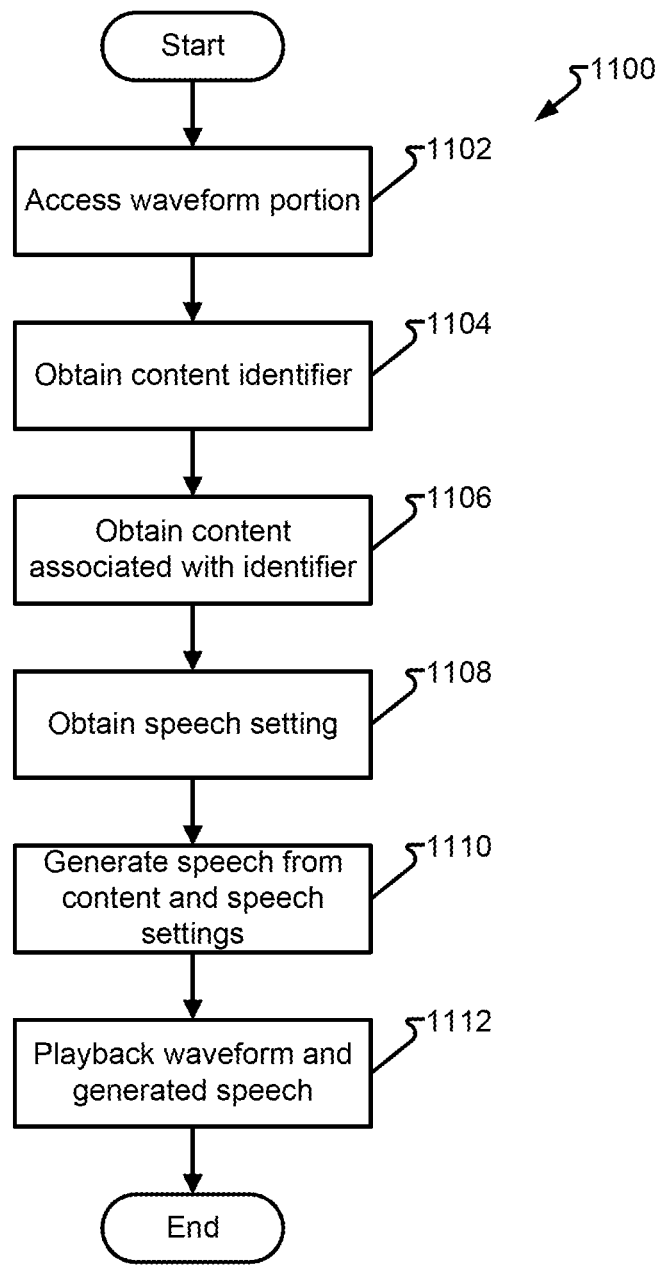
FIG. 11 depicts a playback process in accordance with embodiments of the present disclosure.

FIG. 11 depicts a playback process 1100 in accordance with embodiments of the present disclosure. In one embodiment, process 1100 is an algorithm or a portion of an algorithm executed by a microprocessor configured with machine instructions to carry out the algorithm, such as a microprocessor of server 108. In step 1102, a waveform portion, such as content 506 of record 510B and 510D, which may be received from a device such as user device 104 is accessed, such as from recorded interaction database 114. Step 1104 obtains content identifier such as a content 506 comprising content identifier of record 510A, 510C, and 510E. Next, the content identifier is utilized to get the associated content, such as content 404 from speech content records 400.

Speech settings are obtained in step 1108, which may be session speech settings 206 and/or content settings 508. Speech content is then generated comprising speech from of the content obtained in step 1106 and "spoken" (e.g., apparent age, apparent gender, accent, etc.) in a manner determined by the speech settings obtained in step 1108. The waveforms and generated speech are then played back, such as to a speaker or other audio waveform recording or presenting equipment. Process 1100 may be performed with respect to a single or number of interactions between one or more user devices 104 and server(s) 108 or a portion or portions thereof.

Figure 12:
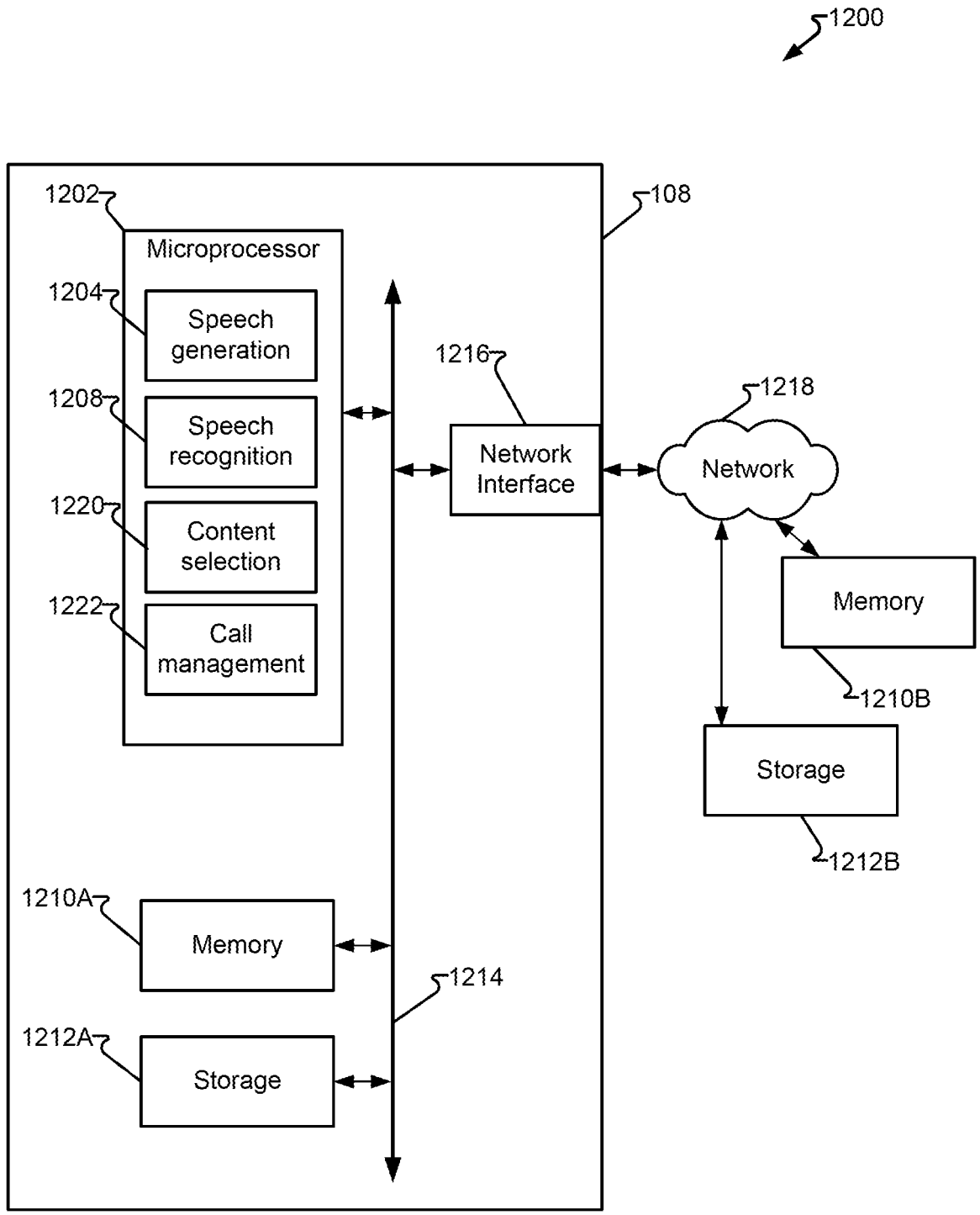
FIG. 12 depicts a server system in accordance with embodiments of the present disclosure.

FIG. 12 depicts server system 1200 in accordance with embodiments of the present disclosure. It should be appreciated that server 108 may comprise the addition of or omission of certain components, which may be deployed on a different server or other computing device or devices. Server 108 may comprise microprocessor 1202 configured, via wiring, circuitry, instructions or a combination thereof, to perform the operations described herein and optionally other operations. Server 108 may comprise speech generation component 1204 to generate sound waveforms, which may be encoded for transmission via a computer network (e.g., network 106), from text. Speech recognition 1208 may be utilized to receive waveforms, such as from user device 104, and convert the waveform into machine inputs and thereby enable microprocessor 1202 to be responsive to voice inputs. Content selection 1220 determines an appropriate response. For example, receiving a waveform of "What is my balance?" would be converted to accessing a particular data record (e.g., balance information) for a particular user's (e.g., user 102) account and providing the value to speech generator 1204 for generation and transmission. Optionally, microprocessor 1202 may utilized call management 1222, such as to connect, disconnect, transfer, place on/off hold, etc. voice communications over network 106. However, it should be appreciated that other components may be utilized to provide call management services.

Microprocessor 1202 may have on-chip memory, such as data registers holding values that cause the microprocessor to perform a particular action (e.g., machine code). Additionally or alternatively, memory 1210 may store data and/or instructions for microprocessor 1202, such as in ROM, RAM, media, solid state storage, etc. Storage 1212 may comprise media storage that is magnetic, optical, or electrical, such as to maintain data or instructions not currently needed and may further include one or more of settings and speech content database 110, content database 112, recorded interaction database 114, or a portion (e.g., cache) thereof. Memory 1210 may comprise internal memory 1210A and/or external memory 1210B. Similarly, storage 1212 may comprise internal storage 1212A and/or external storage 1212B. Microprocessor 1202 and other components maybe interconnected via internal bus 1214 and/or network interface 1216 connecting to other systems and networks. Network interface 1216 may comprise an interface to an internal network (e.g., Ethernet, WiFi, etc.) and/or external network (e.g., Internet, PSTN, etc.), which may comprise network 106. Internal bus 1214 may be any data-conveyance system, including but not limited to one or more of a bus, backplane, cable, PCI, PCIe, etc. providing control, address, and/or data conveyance.

Microprocessor 1202 provides circuitry to perform computational operations, such as registers, I/O unit, buffers, queue pointers, etc. which may be configured upon loading of software or, in another embodiment, circuit-programmed (e.g., ASIC).

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A server, comprising:
 a microprocessor;
 a data storage; and
 network interface; and
 wherein the microprocessor:
  performs a two-way interactive voice communication with a user device connected, via the network interface, to a network, wherein the microprocessor provides a first portion of the two-way interactive voice communication and receives a second portion of the two-way interactive voice communication and wherein the first portion comprises speech generated by the microprocessor and the second portion comprise speech received by the microprocessor; and
  store, in the data storage, a recorded two-way voice communication, comprising speech data utilized by the microprocessor to generate the speech of the first portion and an audio waveform recording of the second portion; and
  verify, prior to storing the recorded two-way voice communication in the data storage, the first portion, the verification comprisng comparing an audio of the first portion, as sent to the user device, with speech generated by the microprocesor from the speech data; and
  wherein the speech data comprises an initial session setting, a subsequent session setting, and a time-stamp of a transition from the initial session setting to the subsequent session setting.

2. The server of claim 1, wherein the microprocessor generates the speech of the first portion, comprising:
 selecting content from a plurality of content maintained in the data storage, wherein the selected content comprises a content identifier and an audio waveform file;
 generating sound from the audio waveform file;
 providing the sound to the first portion; and
 setting the speech data to comprise the content identifier.

3. The server of claim 1, wherein the microprocessor provides the first portion, comprising:
 selecting content from a plurality of content maintained in the data storage, wherein the selected content comprises a content identifier and an associated a textual representation of the content;
generating a spoken form of the textual representation of the content;
providing the spoken form of the textual representation of the content as the first portion; and
setting the speech data to comprise the content identifier.

4. The server of claim 1, wherein the microprocessor provides the first portion, comprising:
accessing an attribute of a user of the user device;
setting at least a portion of the speech data in accordance with the attribute; and
generating the speech in accordance with the speech data.

5. The server of claim 1, wherein the comparison of the audio of the first portion with the speech generated by the microprocessor from the speech data further comprises a second generation of speech data by at least one of a different microprocessor or the microprocessor at a subsequent time following the generation of the speech generated by the microprocessor.

6. The server of claim 1, wherein the speech data comprises a content delivery setting.

7. The server of claim 6, wherein the content delivery setting comprises one or more of length of initial silence, urgency, insertion of non-content expressions, or an amount of change to any one or more of content delivery settings.

8. The server of claim 1, wherein the speech data is a non-audio representation of the first portion without any audio waveform data.

9. The server of claim 1, wherein the speech data comprising a speech setting determining non-verbalized content of the first portion.

10. The server of claim 9, wherein the speech setting comprises at least one of apparent age, gender, nationality, accent, location, dialect, formality, education, confidence, patience, pace, or mood.

11. A method, comprising:
engaging in an interactive two-way voice communication between a microprocessor and a user device over a network;
generating, by the microprocessor, a first portion of the interactive two-way voice communication comprising speech generated by the microprocessor and provided to the user device via the network; and
receiving, by the microprocessor, a second portion of the interactive two-way voice communication comprising speech received from the user device via the network;
recording the interactive two-way voice communication, the recorded interactive two-way voice comprising speech data utilized by the microprocessor to generate the speech of the first portion and an audio recording of the second portion; and
prior to storing the recorded interactive two-way voice communication in data storage, verifying the first portion, the verifying comprising comparing an audio of the first portion, as sent to the user device, with speech generated by the microprocessor from the speech data; and
wherein the speech data comprises an initial session setting, a subsequent session setting, and a timestamp of a transition from the initial session setting to the subsequent session setting.

12. The method of claim 11, further comprising:
selecting content from a plurality of content maintained in a data storage, wherein the selected content comprises a content identifier and an audio file;
generating sound from the audio file;
providing the sound to the first portion; and
setting the speech data to comprise the content identifier.

13. The method of claim 11, further comprising:
selecting content from a plurality of content maintained in a data storage, wherein the selected content comprises a content identifier and a textual representation of the content;
generating a spoken form of the textual representation of the content;
providing the spoken form of the textual representation of the content as the first portion; and
setting the speech data to comprise the content identifier.

14. The method of claim 11, further comprising:
accessing an attribute of a user of the user device;
setting at least a portion of the speech data in accordance with the attribute; and
generating the speech in accordance with the speech data.

15. The method of claim 14, wherein the speech data comprises at least one content delivery setting.

16. The method of claim 15, wherein the at least one content delivery setting comprises one or more of length of initial silence, urgency, insertion of non-content expressions, or an amount of change to any one or more of content delivery settings.

17. The method of claim 11, wherein the speech data comprising a speech setting determining non-verbalized content of the first portion.

18. The method of claim 17, wherein the speech setting comprises at least one of apparent age, gender, nationality, accent, location, dialect, formality, education, confidence, patience, or mood.

19. A system, comprising:
means to engage in an interactive two-way voice communication between a microprocessor and a user device over a network;
means to generate a first portion of the interactive two-way voice communication comprising speech generated by the microprocessor and provided to the user device via the network; and
means to receive a second portion of the interactive two-way voice communication comprising speech received from the user device via the network;
means to record the interactive two-way voice communication, the recorded interactive two-way voice comprising speech data utilized by the microprocessor to generate the speech of the first portion and an audio recording of the second portion and wherein the speech data is absent sound waveform data; and
means to, prior to storing the recorded interactive two-way voice communication in data storage, verify the first portion, the verification comprising comparing an audio of the first portion, as sent to the user device, with speech generated by the microprocessor from the speech data; and
wherein the speech data comprises an initial session setting, a subsequent session setting, and a timestamp of a transition from the initial session setting to the subsequent session setting.

20. The system of claim 19, further comprising:
means to access an attribute of a user of the user device;
means to set at least a portion of the speech data in accordance with the attribute; and
the means to generate the speech in accordance with the speech data.

* * * * *

UNITED STATES PATENT AND TRADEMARK OFFICE
CERTIFICATE OF CORRECTION

PATENT NO. : 11,222,642 B2
APPLICATION NO. : 16/257681
DATED : January 11, 2022
INVENTOR(S) : Thomas Moran It is certified that error appears in the above-identified patent and that said Letters Patent is hereby corrected as shown below:

In the Claims

At Column 20, Line 39, please delete "comprise" and insert --comprises-- therein.

At Column 20, Line 48, please delete "comprisng" and insert --comprising-- therein.

At Column 20, Line 50, please delete "microprocesor" and insert --microprocessor-- therein.

Signed and Sealed this
Seventeenth Day of May, 2022

Katherine Kelly Vidal
*Director of the United States Patent and Trademark Office*